United States Patent
Christensen et al.

(10) Patent No.: US 7,200,676 B2
(45) Date of Patent: Apr. 3, 2007

(54) TRANSMITTING AND RECEIVING MESSAGES THROUGH A CUSTOMIZABLE COMMUNICATION CHANNEL AND PROGRAMMING MODEL

(75) Inventors: Yann Erik Christensen, Seattle, WA (US); Ryan T. Sturgell, Seattle, WA (US); Erik B. Christensen, Seattle, WA (US); Jesus Ruiz-Scougall, Redmond, WA (US); Alex DeJarnatt, Seattle, WA (US); Michael J. Marucheck, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 820 days.

(21) Appl. No.: 10/400,747

(22) Filed: Mar. 26, 2003

(65) Prior Publication Data

US 2004/0249950 A1 Dec. 9, 2004

(51) Int. Cl.
G06F 15/173 (2006.01)
G06F 15/16 (2006.01)
G06F 9/44 (2006.01)

(52) U.S. Cl. .................... 709/238; 709/203; 717/100; 717/105

(58) Field of Classification Search ............... None
See application file for complete search history.

(56) References Cited

U.S. PATENT DOCUMENTS

| | | | |
|---|---|---|---|
| 6,425,017 B1 | 7/2002 | Dievendorff et al. | 709/315 |
| 6,442,620 B1 | 8/2002 | Thatte et al. | 709/316 |
| 6,990,513 B2 * | 1/2006 | Belfiore et al. | 709/203 |
| 2003/0084127 A1 * | 5/2003 | Budhiraja et al. | 709/220 |

FOREIGN PATENT DOCUMENTS

| | | |
|---|---|---|
| EP | 1 164 482 | 12/2001 |
| EP | 1229442 A2 | 8/2002 |
| WO | WO 00/034857 | 6/2000 |
| WO | WO 03/014927 | 2/2003 |

OTHER PUBLICATIONS

Fensel et al. "The Web Services Modeling Framework WSMF", 2002.*
Kreger, "IBM Web Services Conceptual Architecture (WSCA 1.0)", May 2001.*

(Continued)

*Primary Examiner*—Wen-Tai Lin
(74) *Attorney, Agent, or Firm*—Workman Nydegger (57) ABSTRACT

Methods, systems, and computer program products for abstracting processing layers within a messaging infrastructure so that changes or enhancements can be made to the infrastructure while retaining existing functionality. Message transport implementations are abstracted within a message layer, allowing other layers within the infrastructure to interact with messages in a more structured fashion, largely independent of message transport. Transport examples include named pipes, Transmission Control Protocol (TCP), HyperText Transfer Protocol (HTTP), Simple Mail Transfer Protocol (SMTP), etc. A channel layer above the message layer abstracts message exchange implementations, allowing other layers within the infrastructure to send and receive messages in a more structured fashion, largely independent of the message exchange semantics of a specific implementation. Message exchange examples include datagrams, dialogs, monologs, queues, and the like. Above the channel layer and message layer, a service layer abstracts the binding implementations that bind message exchange implementations to user code implementations.

41 Claims, 6 Drawing Sheets

OTHER PUBLICATIONS

Simmonds, Devon; and Ghosh, Sudipto; "*Middleware Transparency through Aspect-Oriented Programming Using AspectJ and Jini*," Proceedings of the SPIE—International Society for Optical Engineering, Jul. 3 -Aug. 1, 2002, vol. 4863, pp. 16-27.

Clemente, Pedro J.; Hernandez, Juan; Murillo, Juan M.; Perez, Miguel A.; and Sanchez, Fernando; "*AspectCCM: An aspect-oriented extension of the Corba Component Model*,"Proceedings of 28th Euromicro Conference, Sep. 4-6, 2002, pp. 10-16.

WebMethods, "Implementing Enterprise Web Services with the WebMethods Integration Platform" WebMethods, Inc., Mar. 2002.

Sahai, A., et al, "Message Tracking in SOAP-Based Web Services" Institute of Electrical and Electronics Engineers, 2002 IEEE/IFIP Network Operations and Management Symposium, Apr. 2002.

Curbera F. et al., "Unraveling the Web Services Web: An Introduction to SOAP, WSDL, and UDDI" IEEE Internet Computing, IEEE Service Center, Piscataway, NJ, vol. 6 No. 2, 2002, pp. 86-93.

Singh, Gurdip; Maddula, Bob; and Qiang Zeng; "*Enhancing Real-Time Event Service Synchronization in Object Oriented Distributed Systems*," Proceedings Fifth IEEE International Symposium on Object-Oriented Real-Time Distributed Computing, ISIRC 2002, Apr. 29-May 1, 2002, pp. 233-240.

Gray, Jeff; "*Using Software Component Generators to Construct a Meta-Weaver Framework*," Proceedings of the 23rd International Conference on Software Engineering. ICSE 2001, May 12-19, 2001, pp. 789-790

Walker, Robert J.; Baniassad, Elisa L.A.; and Murphy, Gail C.; "*An Initial Assessment of Aspect-oriented Programming*," Proceedings of the 1999 International Conference on Software Engineering (ICSE '99), May 16-22, 1999, pp. 120-130.

Nebbe, Robb, D.; "*Coordination and Composition: The Two Paradigms Underlying AOP?*" Object-Oriented Technology, ECOOP'98 Workshop Reader. ECOOP'98 Workshops, Demos, and Posters, Jul. 20-24, 1998, pp. 402-405.

Bradbury, Danny; "*.Net benefits*," Application Development Advisor, Oct. 2001, vol. 5, No. 8, pp. 16-18.

Van Nieuwpoort, Rob; Maassen, Jason, and Bal, Henri E.; "*Wide-area parallel programming using the remote method invocation model*," Concurrency: Practice and Experience, Jul. 2000, vol. 12, No. 8, pp. 643-666.

Bogunovic, Nikola; "*A Programming Model for Composing Data-Flow Collaborative Applications*," Proceedings ECBS'99. IEEE Conference and Workshop on Engineering of Computer-Based Systems, Mar. 7-12, 1999, pp. 106-112.

\* cited by examiner

TRANSMITTING AND RECEIVING MESSAGES THROUGH A CUSTOMIZABLE COMMUNICATION CHANNEL AND PROGRAMMING MODEL

BACKGROUND OF THE INVENTION

1. The Field of the Invention

The present invention relates to messaging infrastructures. More particularly, the present invention relates to methods, systems, and computer program products that abstract processing layers within a messaging infrastructure so that changes or enhancements can be made while reusing existing functionality.

2. Background and Related Art

With the rising connectivity among computers that many of today's powerful networks provide, distributed processing has become increasingly attractive for a wider range of applications. However, most modern infrastructures for developing distributed applications offer little flexibility in terms of selecting from among available and emerging communication technology. For example, programming models, message exchange semantics, and message transports tend to be tightly coupled. As a result, selection of any one, often dictates the others.

Figure 1A:
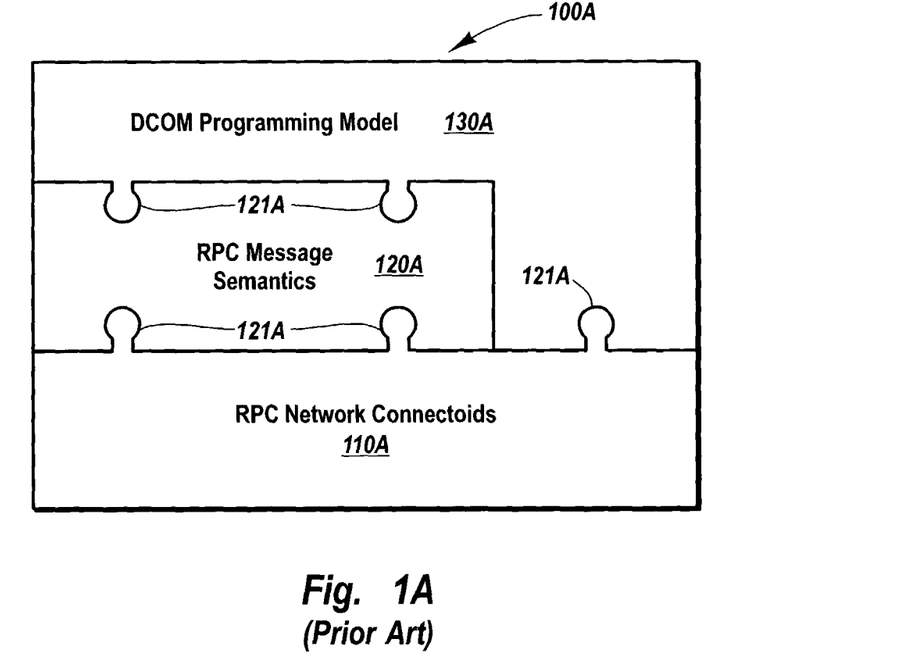
FIGS. 1A–1B illustrate prior art examples of tightly coupled messaging infrastructures.

FIG. 1A illustrates a prior art example of a tightly coupled messaging infrastructure 100A based on the Distributed Component Object Model (DCOM). DCOM is an extension of the Component Object Model (COM) that allows components to communicate both within a network and across network boundaries-COM was limited to interprocess communication within a single machine. A developer desiring to use DCOM accepts the DCOM programming model 130A, Remote Procedures Call (RPC) message exchange semantics 120A, and the corresponding RPC network connectoids 110A, as a bundle.

Figure 1B:
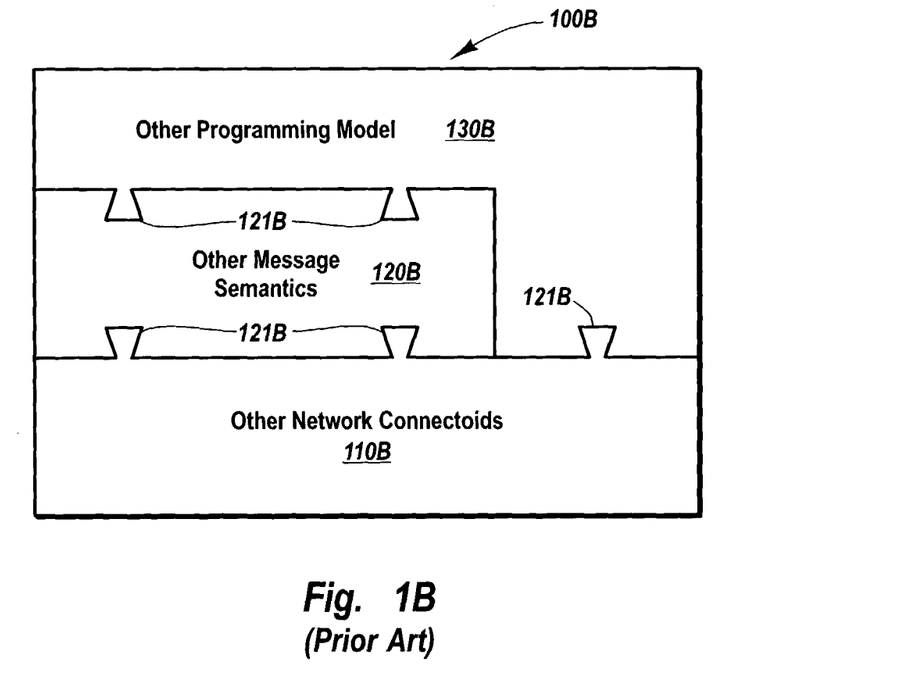

FIG. 1B illustrates another prior art example of a tightly coupled messaging infrastructure 100B. Similar to the DCOM infrastructure shown in FIG. 1A, this other messaging infrastructure 100B includes other programming model 130B, other message exchange semantics 120B, and other network connectoids 110B. Note that the interlocking portions 121B of other programming model 130B, other message exchange semantics 120B, and other network connectoids 110B differ from the interlocking portions 121A of DCOM programming model 130A, RPC message exchange semantics 120A, and RPC network connectoids 110A. The differences between interlocking portions 121A and 121B illustrate the prior art's lack of flexibility in choosing from the variety of existing and emerging options for developing distributed applications. Having selected DCOM or some other technology and its corresponding infrastructure, it becomes a relatively difficult task to use features from other technologies, without sacrificing the effort expended in developing existing applications. Often, such technology changes or enhancements require starting over, essentially from scratch.

Accordingly, decoupled programming models, message exchange semantics, and message transports represent an advancement in the art. Developers are able to pick from features at one level within the infrastructure without having to worry about unrelated issues at another level. Furthermore, developers can move from one programming model to another without having to learn a new infrastructure. Decoupling the layers leads to greater reusability and encourages innovation because changes and enhancements in a decoupled infrastructure allow for existing development efforts to be retained.

BRIEF SUMMARY OF THE INVENTION

The present invention relates to methods, systems, and computer program products for abstracting processing layers within a messaging infrastructure so that subsequent changes or enhancements can be made to the infrastructure while retaining or reusing existing functionality. In accordance with example embodiments of the present invention which are described more fully below, the infrastructure includes three primary layers: a message layer, a channel layer, and a service layer. Each of these layers abstracts functionality so that the details of a particular implementation are generally hidden from other layers.

In one example embodiment, message transport implementations are abstracted within a message layer, allowing other layers within the infrastructure to interact with messages in a more structured fashion, largely independent of message transport. Examples of message transport include named pipes, Transmission Control Protocol (TCP), HyperText Transfer Protocol (HTTP), Simple Mail Transfer Protocol (SMTP), etc. A channel layer above the message layer abstracts message exchange implementations, allowing other layers within the infrastructure to send and receive message in a more structured fashion, largely independent of the message exchange semantics of a specific message exchange implementation. Examples of message exchange implementations include datagrams, dialogs, monologs, queues, and the like. Above the channel layer and message layer, a service layer abstracts the binding Z, U implementations that bind message exchange implementations to user code implementations (e.g., applications) that use the infrastructure. The service layer, describes at least in part, a programming model for using the messaging infrastructure.

Each layer of abstraction may correspond to a plurality of program modules for the abstracted implementation. The message layer abstraction may abstract ports that provide an atomistic send/receive abstraction for messages. For each abstracted implementation, the infrastructure may include a specific instance of the abstraction representing the implementation for use within the infrastructure. For example, an instance of a channel abstraction may be bound to an instance of a service or user code implementation for processing messages. The binding may be performed by a service proxy for the channel and user code implementations. As messages flow through the instances and service proxy, they may be intercepted and further processed. The service layer abstraction may abstract a service store implementation that manages the physical lifetime of service or user code instances.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered as limiting its scope, the invention will be described and explained with additional specificity and detail through the use of the accompanying drawings in which.

DETAILED DESCRIPTION OF THE PREFERRED EMBODIMENTS

The present invention extends to methods, systems, and computer program products for abstracting processing layers within a messaging infrastructure so that subsequent changes or enhancements can be made to the infrastructure without necessarily having to re-implement existing functionality. The embodiments of the present invention may comprise one or more special purpose and/or one or more general purpose computers including various computer hardware, as discussed in greater detail below.

Figure 2:
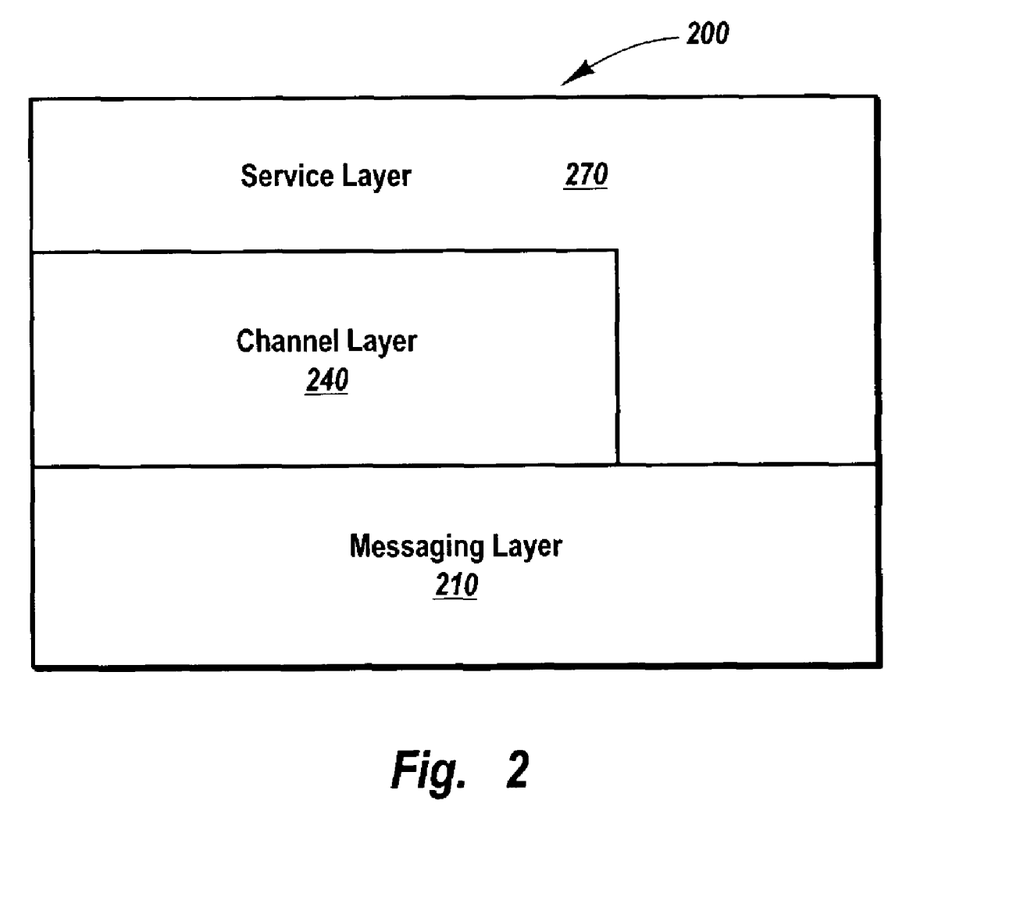
FIG. 2 illustrates a high-level representation of a messaging infrastructure in accordance with the present invention.

FIG. 2 illustrates a high-level representation of an example messaging infrastructure 200 in accordance with the present invention. Greater detail with respect to an example implementation of a messaging infrastructure is provided below, in connection with FIG. 5. The infrastructure 200 supports distributed programming through a layered architecture (e.g., the infrastructure may be viewed as an ordered set of sub-systems, where each sub-system depends on previous sub-systems). For example, in messaging infrastructure 200, the principle layers include a messaging layer 210, a channel layer 240, and a service layer 270.

As described in more detail below, each of these layers abstracts certain implementation details so that like things may be treated in a common way. The abstractions decouple programming models, message exchange semantics, and message transports so that developers are able to pick from features at one level within the infrastructure without having to worry about unrelated issues at another level. As a result, developers can, for example, move from one programming model to another without having to learn a new infrastructure. This abstraction leads to greater reusability and encourages innovation because changes and enhancements in a decoupled infrastructure allow for existing development efforts to be retained.

The bottom layer, messaging layer 210, provides endpoint-to-endpoint transmission or transport of messages. The messaging layer 210 supports transport extensibility so that as new transports are implemented, they may be used by other layers within the infrastructure. For example, messaging layer 210 abstracts implementations for transport protocols, such as named pipes, Transmission Control Protocol (TCP), HyperText Transfer Protocol (HTTP), Simple Mail Transfer Protocol (SMTP), etc. Accordingly, in simple terms, messaging layer 210 provides an atomistic message send/receive abstraction to the other layers within the infrastructure so that the other layers can process messages, somewhat independent of the particular transport protocol used to send or receive the messages.

The messaging layer 210 allows for extensible interception of messages as they leave from and arrive at endpoints. The extensible interception mechanism may be used to implement behaviors such as routing, filtering, policy management, and security. Both the transports and behaviors available at endpoints in messaging layer 210 can be established either programmatically or through configuration.

The channel layer 240 provides messaging abstractions on top of the transport abstractions provided by messaging layer 210. Channels represent behavior implemented between endpoints and an object model that abstracts the implemented behavior. Examples of common channels include datagram channels for unidirectional uncorrelated messaging, dialog channels for bidirectional correlated messaging, monolog channels for publication/subscription or unidirectional broadcast messaging, and queue channels for unidirectional queued messaging. Application or user code uses channels by creating channel instances (e.g., an in-memory channel object) at one endpoint and sending messages on those instances. When a message reaches the other endpoint, application or user code recognizes the channel created on the sending side of the channel and creates a channel instance to participate in the conversation.

Service layer 270 provides programming models on top of channel layer 240 and messaging layer 210. Application programmers typically will use messaging infrastructure 200 at the service layer. Service layer programming models are distinguished from one another by message dispatch mechanisms, how messages are sent (e.g., structures versus typed method calls), and type systems. Service layer 270 provides a general mechanism to bind instances of the programming model to the channel instances described above. The service layer 270 also provides those features which programming models choose to provide developers, such as state and lifetime control, service management, call interception, and synchronized message dispatch. Both simple and complex programming models may be developed for the service layer. In order to facilitate appropriate binding and interoperability, programming models generally will define a fixed relationship between messaging layer transport types and types defined and controlled within the infrastructure itself, particularly types corresponding to application or user code objects within the service layer 270.

Figure 3:
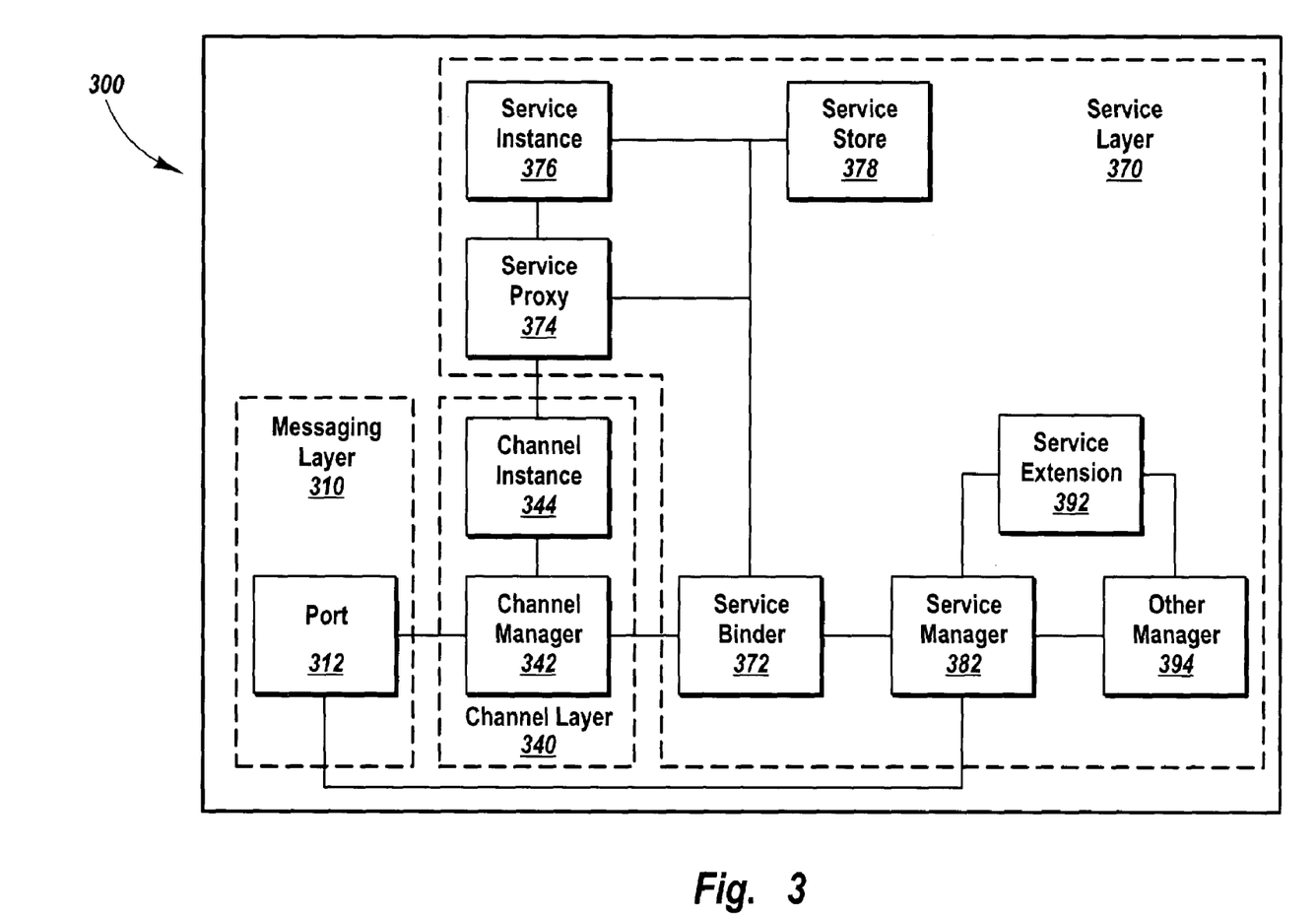
FIG. 3 is a block diagram showing an example embodiment of a messaging infrastructure in accordance with the present invention.

FIG. 3 is a block diagram showing an example embodiment of a messaging infrastructure 300 in accordance with the present invention. In general, the messaging infrastructure 300 is made up of modules for binding channel instances (i.e., in-memory channel abstraction objects) with instances of code implemented through the supported programming models. Similar to the description above with respect to FIG. 2, FIG. 3 includes a messaging layer 310, a channel layer 340 and a service layer 370. The description of FIG. 3 may be divided into two general categories: the messaging infrastructure itself, and programming models that can be supported by the messaging infrastructure. The discussion that follows begins by describing the messaging infrastructure, and then turns to a description of an example programming model. Although references to components illustrated in FIG. 3 may be in the singular, it should be understood that multiples of each component may and often will be present within a single infrastructure.

Three managers, one within each layer, implement much of the basic functionality offered by infrastructure 300: the port 312 in messaging layer 310, the channel manager 342 in channel layer 340, and the service manager 382 in service layer 370. Accordingly, the description of FIG. 3 initially focuses on these three managers generally, and then turns to a more detailed discussion of the three managers and the other components that are illustrated. The first of the three managers, port 312, acts as a multiplexing broker between transport implementations and the rest of the infrastructure. In simple terms, the port 312 and messaging layer 310 provide an atomistic message send/receive abstraction to the messaging infrastructure 300. As indicated previously, this abstraction relieves other layers from the burden of understanding the details associated with individual transport implementations. Rather, other layers interact with a message abstraction, and leave the details of how messages are transported to messaging layer 310 and port 312.

The second of the three managers, channel manager 342 in channel layer 340, gathers and correlates messages, possibly stores and/or orders them, and presents a higher-level channel abstraction to the service layer 370 in general, and to service manager 382 and one or more service binders 372 in particular. As described in more detail below, typically one service binder exists for each channel/programming model combination. Similar to the message abstraction offered by messaging layer 310, here too, the channel abstraction provided by channel layer 340 and channel manager 342 relieves other layers from the need to understand details associated with individual message exchange semantics. Other layers simply interact with a channel abstraction, and leave the details of how messages are exchanged (e.g., datagram, dialog, etc.) to channel layer 340.

The third of the three managers, service manager 382, is responsible for hooking service binders 372 to channel manager 342 (and potentially port 312 through channel manager 342) and for providing an interface for application code, such as service instance 376, to interact with service layer 370. Accordingly, whether or not a channel manger interacts with a port or uses some other form of connectivity is potentially isolated from the service binder. This isolation is significant because some connectivity mechanism may decide not to connect through a port. Since a service binder 372 also understands the details of both a particular channel and programming model, service binders are used to connect service instances 376 to channel instances 344. As described in more detail below, the service binder 372 cooperates with service store 378 to create and register instances.

Service binder 372 binds service instances 376 to channels instances 344 using a service proxy 374, which is also described below in more detail. Once instances are created, the service store 378 abstracts their durability (e.g., lifetime, etc.) and location from the rest of the infrastructure. Messages and calls flowing into service instances can be intercepted by code supplied by service extensions 392 registered with the service manager 382. Service instances communicate with the infrastructure through an interface on the service instances, termed a service site, that implements functions commonly used by an instance. The service site of an instance is initialized (or sited) when the service store creates the instance.

The service manager 382 is a set of interfaces that are used to create channels and access other components within the infrastructure and is the entity through which the infrastructure is configured. When a service manager is created, it creates the service binders, service stores, and service types that are available at a port, and connects them to the infrastructure. If a port is capable of handling requests for multiple services, only a single service manager is associated for the port. Although traditional infrastructures may have some form of service manager for creating instances and managing infrastructure coordination, service manager 382 performs its tasks indirectly, by delegating this work to other modules appropriate for a particular task. As a result, service manager 382, like other components of infrastructure 300, supports a high degree of extensibility, whereas service managers in traditional infrastructures tend to create instances and manage infrastructure coordination directly, making innovation difficult because existing functionality may need to be re-implemented to support a new behavior or functionality.

The service binder 372 is responsible for managing the relationship between channel instances 344, service instances 376, and the service stores 378. Accordingly, service binder 372 typically has specific knowledge of a particular channel and programming model. Channels implement idiosyncratic events and interfaces that the service binder 372 uses to move messages into and out of the channel layer 340. Programming models specify a mapping between types that the service binder uses to apply messages to methods and turn method calls into messages. Because each channel and programming model is different, a service binder usually supports one of each. In other words, there is generally one service binder for each channel/programming model pair. At startup time for the infrastructure, service binders find and attach themselves to their corresponding channel manager. Accordingly, a running port typically is associated with one or more service binders for each supported channel/program model pair.

An example programming model may map between a Web Services Definition Language (WSDL) port type and a managed type within the infrastructure runtime. WSDL is an XML format that describes network services as a set of endpoints which are capable of exchanging messages. It provides a relatively simple mechanism for specifying the basic format of requests independent of the underlying protocol (Simple Object Access Protocol-SOAP, HTTP GET/POST, etc.) or encoding (Multipurpose Internet Mail Extensions-MIME, etc.) Abstract operations and messages are bound to specific network protocols and message formats to define an endpoint. Accordingly, WSDL services are collections of endpoints, also known as ports. In WSDL, port types describe collections of operations. It should be appreciated that FIG. 3 illustrates an example embodiment of the present invention in which the infrastructure includes managed code data types which are mapped to WSDL. The present invention, however, may be practiced in a variety of environments, and is not restricted to those with managed code/data types or WSDL port types.

Service binders 372 are linked to a service manager 382 by configuration. When a port is created and opened, the service binders 372 are registered with the port in order to intercept messages and/or receive events about the state of the infrastructure. Service binders are associated with a set of port/service types. Uniqueness of types across service binders results from managed types within the infrastructure runtime that implement a service inheriting from interface types that are unique to a service binder. For the example infrastructure 300, the same process that opens a port also opens the service manager 382 and all of the service binders 372 available at the port. When opened, messages begin to flow through service binders and further configuration is limited. For example, a new port type not previously seen by the service manager 382 and service binder 372 could be bound, but most other configuration is prohibited.

When user code issues a call to the service manager 382 to create a channel, the service manager iterates over the set of registered service binders and offers each the chance to deal with the specified type. Then, the service manager uses the service binder that recognizes the specified type to create a service instance 376, register it with the service store 378, and bind the service instance to a channel instance 344 with a service proxy 374. Similarly, when a message arrives at a channel that is not associated with an existing service instance, the set of service binders attached to the channel are asked if they recognize the incoming port/service type. The service binder 372 that recognizes the type is used to create a service instance, bind it to the channel instance with a service proxy, and then cause incoming messages to flow through the instances and proxy to user code.

To field a request for a new instance, a service binder creates a service instance 376, registers it with a service store 378, creates a service proxy 374, connects a channel instance 344 to the service proxy 374 and the service proxy 374 to the user code in the service instance 376, and triggers the flow of the first message in the channel. Each message flows from the channel instance to the service proxy 374, which translates them into call stacks and dispatches them to the corresponding service instance. Similarly, calls flow out of the service instance 376 to the service proxy 374, which translates them into messages and sends them via the channel instance to their destination.

While traditional infrastructures may have some form of a service binder, an infrastructure in accordance with the present invention is able to support multiple service binders. Furthermore, in contrast to traditional infrastructures, the service binder collection as a whole is independent of the channel layer below it, as well as the service store and programming models within service layer 370. Traditional infrastructures tend to implement transport, channel, binder, store, and instance functionality in a tightly bound package, which often requires significant changes each time enhancements or changes are made to address evolving technology and application needs.

As indicated above, the service store 378 manages instances. When a service binder fields a request to create a new service instance, the service binder creates an instance and registers the instance with the service store. In some embodiments, the service store may operate as an instance factory, with an API that the service binder can use to create instances. After the instance is created, the service binder uses the store to site the instance (initialize commonly used communication interfaces), and then the service binder binds the channel to the site. The service store 378 keeps track of the number of channels associated with an instance, and releases an instance when no channels are attached. This gives service binders (who see channel close messages/events and the release of proxy instances) the ability to participate in the control of logical instance (an instance as seen from outside of the infrastructure) lifetime.

While binders control the lifetime of logical instances, the service store 378 manages the lifetime of physical instances (actual object instance living in memory). When a service store wants to eliminate a physical instance from memory, it notifies the associated channels so they can disconnect the physical instance from its associated service proxy 374. Then, the next time a call/message is applied to the instance, the service store is responsible for creating a new instance and reconnecting it to the appropriate proxy.

Service stores 378 support varying degrees of respect for the state of an instance. A service store might maintain all instances in memory and never use the disconnect/reconnect mechanism. Alternatively, a service store might maintain all instances in memory and support aggressive disconnect/reconnect in an effort to enforce statelessness on instances. Service stores might support disconnect/reconnect based on machine load, licensing issues (e.g., connections to a database), and/or usage patterns, and combine disconnect/reconnect with instance deserialization/serialization and storage of instances in transacted databases to support durable, reliable instances. The database used by the service store might cooperate with a store used by a durable channel and a router in front of the port to implement the migration of instances from one machine to another. Service stores 378 may be useful in garbage collection, pooling, managing long lived connections, etc.

Service stores in traditional infrastructures tend to link physical and logical instance lifetimes directly. The relationship between the two typically is hard-coded within the infrastructure. As a result, alternatives are difficult to implement without impacting other areas of the system. Furthermore, modification by expert users as an extensibility point or as an infrastructure evolves is impractical, given the significant coupling between service stores and other portions of the infrastructure.

As indicated above, a service proxy 374 is an instance of a service-binder-specific type that links a particular type of channel instance 344 to a particular type of service instance 376. For an incoming call, the service proxy fields events from the channel announcing that a message is available, creates the appropriate call stack from the message, and applies it to the instance. For an outgoing call, the service proxy 374 fields the call, translates it into a message, if necessary, and sends it via the channel instance 344. Depending on direction, a service proxy 374 looks like both a typed channel (e.g., from service instance) and a managed type proxy (e.g., from channel instance).

In addition to its bridging function, certain behavior also is implemented within and through the use of service proxies. For example, one or more service proxies may implement concurrency management, limiting the number of calls that pass into a single service instance at a given point in time. As indicated above with respect to the service store 378, the service proxy implements disconnect/reconnect so that a service store can decouple physical instance lifetime from logical instance lifetime. It should be appreciated that the service proxy 374 allows both the service binder 372 and service store 378 to implement behavior in extensible ways.

In additional to ports 312, channel managers 342, and service manager 382, other managers may exist within infrastructure 300. These managers implement behaviors at some or all levels of the infrastructure, including message filtering and routing, policy exchange and application, security, logging, and transactional services. Each manager that provides extensibility, defines an extension interface to allow other managers to implement that extensibility. For example, the port 312 at the messaging layer 310 supplies a port extension, allowing managers to contribute handlers to the pipelines messages flow though at that layer. Similarly, individual channel managers implement extensions allowing modules like the service manager to hook messages for creating channel instances from the channel.

Service extension 392 is an interface defined by the service manager 382 that allows other managers to hook into the call path extensibility points supported by the infrastructure. When extensions are first established, the service manager passes the reflected type information of the service types it knows about to interested managers via the service extension. Managers that implement service extensions combine this reflection data with their own configuration to establish what they want to do as particular messages/calls flow into and out of service instances. Before- and after-message send and receive notifications are communicated to managers by events flowing through the service extension. This degree of extensibility of the service extension mechanism is not found in traditional infrastructures. As long as the infrastructure is configured to support a behavior generally, no store or other component, except the manager associated with the behavior, needs to be modified in order to introduce that behavior into the infrastructure.

A service instance 376 is an instance of a managed code service type that implements the interface associated with one or more port/service types, perhaps via a wrapper specified as part of a programming model. In general, and as described in further detail below, one way programming models differ is in the way that a conversation is associated with the interfaces and methods on a service type. For the example embodiment illustrated in FIG. 3, service types written against valid programming models have direct mappings between WSDL conversations, operations, and messages, and infrastructure runtime managed code interfaces, methods, and argument types. The infrastructure also could support service types created using different programming models that may look quite different. In addition to interfaces used by the associated service proxy, service types can implement other interfaces to hook themselves into other aspects of infrastructure behavior. For example, a service type might implement special interfaces in order to hook into some service store or participate in some behavior implemented by a service extension.

As described above, a service instance 376 is typically sited (contains a reference to a service site unique to itself). Service instances are site-able by implementing an appropriate interface or by inheriting from a base class that implements the appropriate interface. When a service binder 372 creates a service instance, it uses the service store 378 to site the instance. The service store, in turn, sites the instance by setting the service site property on the corresponding interface. The service site property provides access to the instance infrastructure state, including things like the collection of active channels connected to the instance. The instance may use this state information to acquire, examine, and modify its channel. The service store, also may use this state information when it adds and removes channels from the active channels of the service instance as it binds and unbinds the channel to and from the service instance.

For the example embodiment illustrated in FIG. 3, the infrastructure is designed to support any programming model that implements a direct mapping from WSDL port types to managed code class types for the infrastructure runtime. One example programming model uses managed code attributes to establish the association between WSDL types and managed code types. Programming models of this type are managed code classes decorated with attributes that describe the relationship between the managed code classes and the WSDL contract of the port type they implement. The tools that implement the programming model are capable of either generating WSDL from managed code classes and interfaces decorated with the appropriate attributes, or generating managed code classes and interfaces decorated with the appropriate attributes from WSDL. Other programming models might include remote object models, models for describing the logic sequence of business processes, etc. The term service, therefore, should be interpreted broadly, to cover these and other programming models.

A more traditional remote object model, such as DCOM, can be thought of as consisting of two interfaces, one implemented on the proxy used by the client of the object, the other implemented on the object itself. An application's methods on these two interfaces are usually identical in this sort of programming model, though each might contain infrastructure methods appropriate to one or the other side of the conversation.

In contrast, a WSDL conversation is bi-directional. Its operations are either individual messages or request/response message pairs that can flow in either direction as part of the conversion. To support these operations, the example programming model includes four interfaces, two service implementation interfaces and two channel control interfaces. Each side of the conversation has a service implementation interface with code that will run in reaction to a message or a request, and a channel control interface with proxy methods that will send outgoing messages or requests and events that can be hooked to add processing to incoming messages or requests.

Attributes can configure the details of the mapping of managed code types to WSDL types and the qualities of the instances created to run the code. Examples of attributes include attributes that determine instance lifetime, such as whether a new logical instance is created for each message/request or if a logical instance lasts as long as a connection is maintained. Attributes may specify whether an operation is a message or a request/response message pair, along with attributes or code, as appropriate, to specify whether the method is synchronous or asynchronous. Other attributes may control the relationship between the names of methods and parameters in managed code types and the names of WSDL operations, messages, and parts. Attributes may be used to control the mapping of method calls to messages consisting of a single part wrapping the arguments of the method call, or to a multi-part message consisting of one part per argument. Finally attributes may control the mapping of the programming model to document/literal or RPC/encoded messages. It is also possible to implement code that asks the programming model to pass along the channel instance underlying the service instance, but this has no effect on WSDL.

The present invention also may be described in terms of methods comprising functional steps and/or non-functional acts. The following is a description of acts and steps that may be performed in practicing the present invention. Usually, functional steps describe the invention in terms of results that are accomplished, whereas non-functional acts describe more specific actions for achieving a particular result. Although the functional steps and non-functional acts may be described or claimed in a particular order, the present invention is not necessarily limited to any particular ordering or combination of acts and/or steps.

Figure 4A:
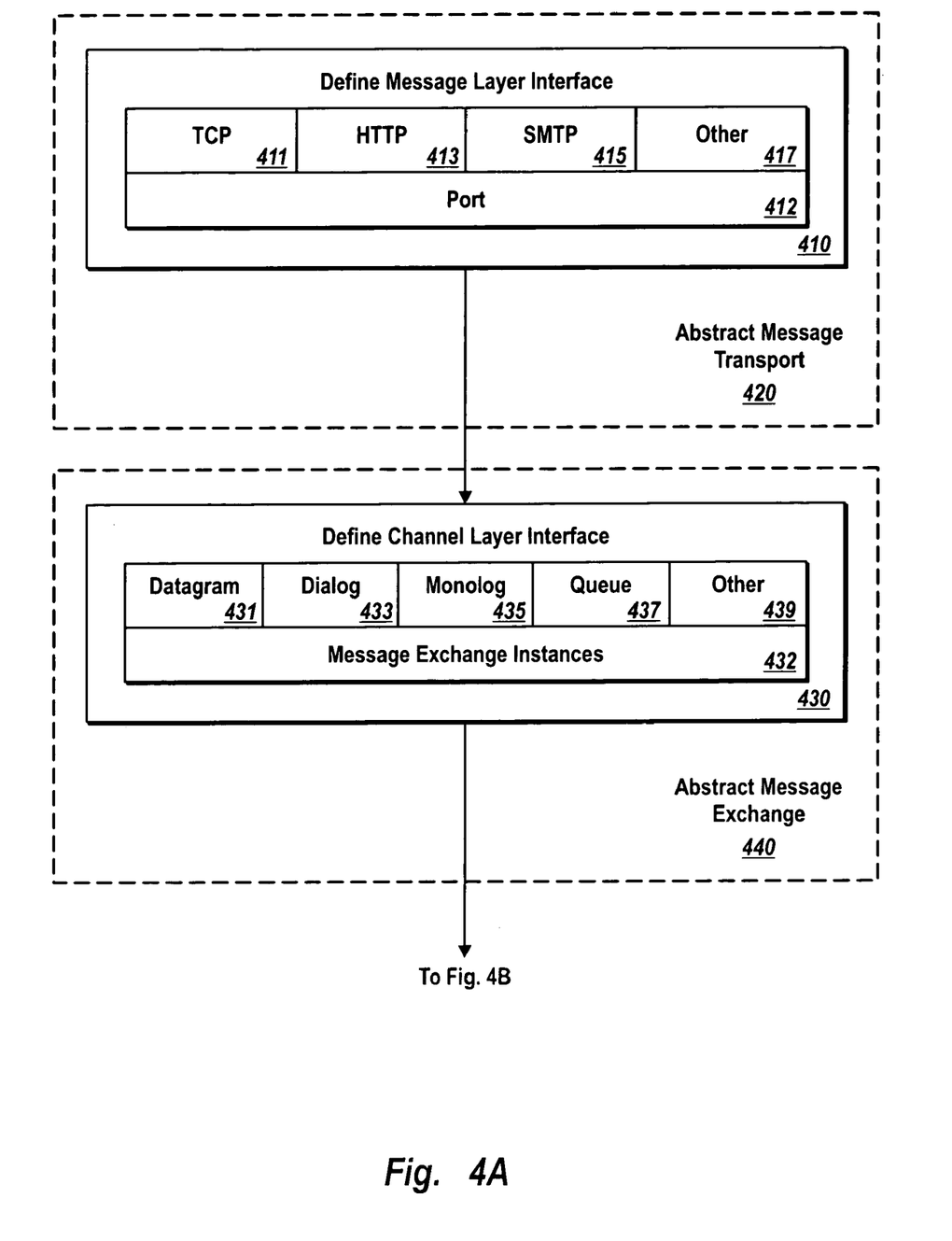
FIGS. 4A–4B show example acts and steps for methods of abstracting processing layers within a messaging infrastructure in accordance with the present invention.
Figure 4B:
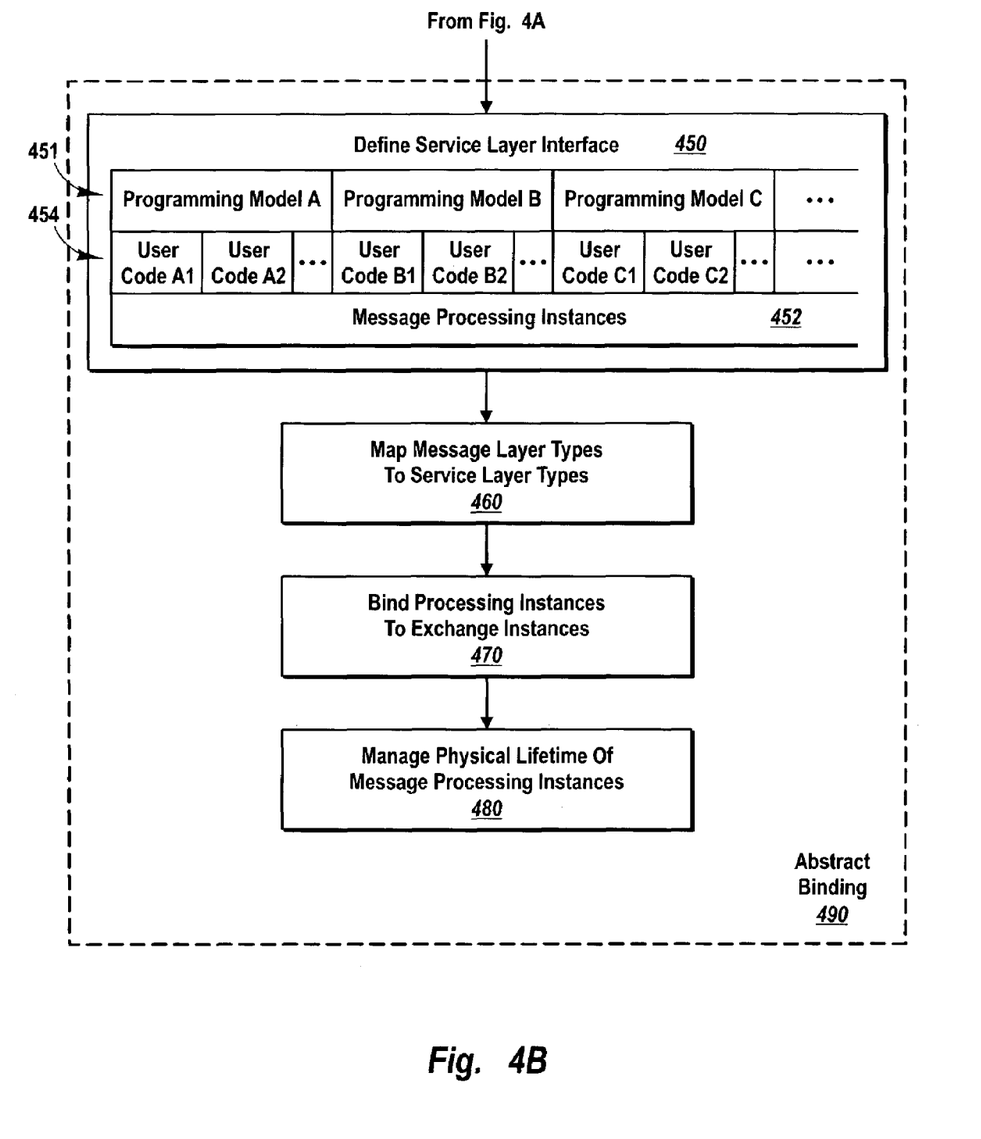

FIGS. 4A–4B show example acts and steps for methods of abstracting processing layers within a messaging infrastructure in accordance with the present invention. A step for abstracting (420) one or more message transport implementations within a message layer may include an act of (410) defining a message layer interface that abstracts the message transport implementations. Examples of message transports include TCP 411, HTTP 413, SMTP 415, and other transports 417. Port 412 is an example of a transport abstraction that provides an atomistic message send/receive abstraction to the channel layer.

A step for abstracting (440) one or more message exchange implementations within a channel layer may include an act of defining (430) a channel layer interface that abstracts one or more message exchange implementations. Examples of message exchange implementations include datagram 431, dialog 433, monolog 435, queue 437, and other exchange implementations 439. A message exchange instance 432 or channel instance is an example of a message exchange abstraction.

A step for abstracting (490) one or more binding implementations within a service layer may include an act of defining (450) a service layer interface that abstracts one or more binding implementations that bind one or more message exchange implementations to user code or message processing implementations. User code 454 written in accordance with programming models 451 operates as message processing instances 452. Programming model A, programming model B, programming model C, etc. are examples of programming models 451, with corresponding user code A1, user code A2, etc., user code B1, user code B2, etc., user code C1, user code C2, etc. to run as message processing instances 452. A step for abstracting (490) one or more binding implementations may further include: mapping (460) message layer types to service layer types (e.g., WSDL to manage code types); binding (470) message processing instances to message exchange instances (e.g., service instances to channel instances); and managing (480) physical lifetime of message processing instances (e.g., through a service store.)

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disc storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 5:
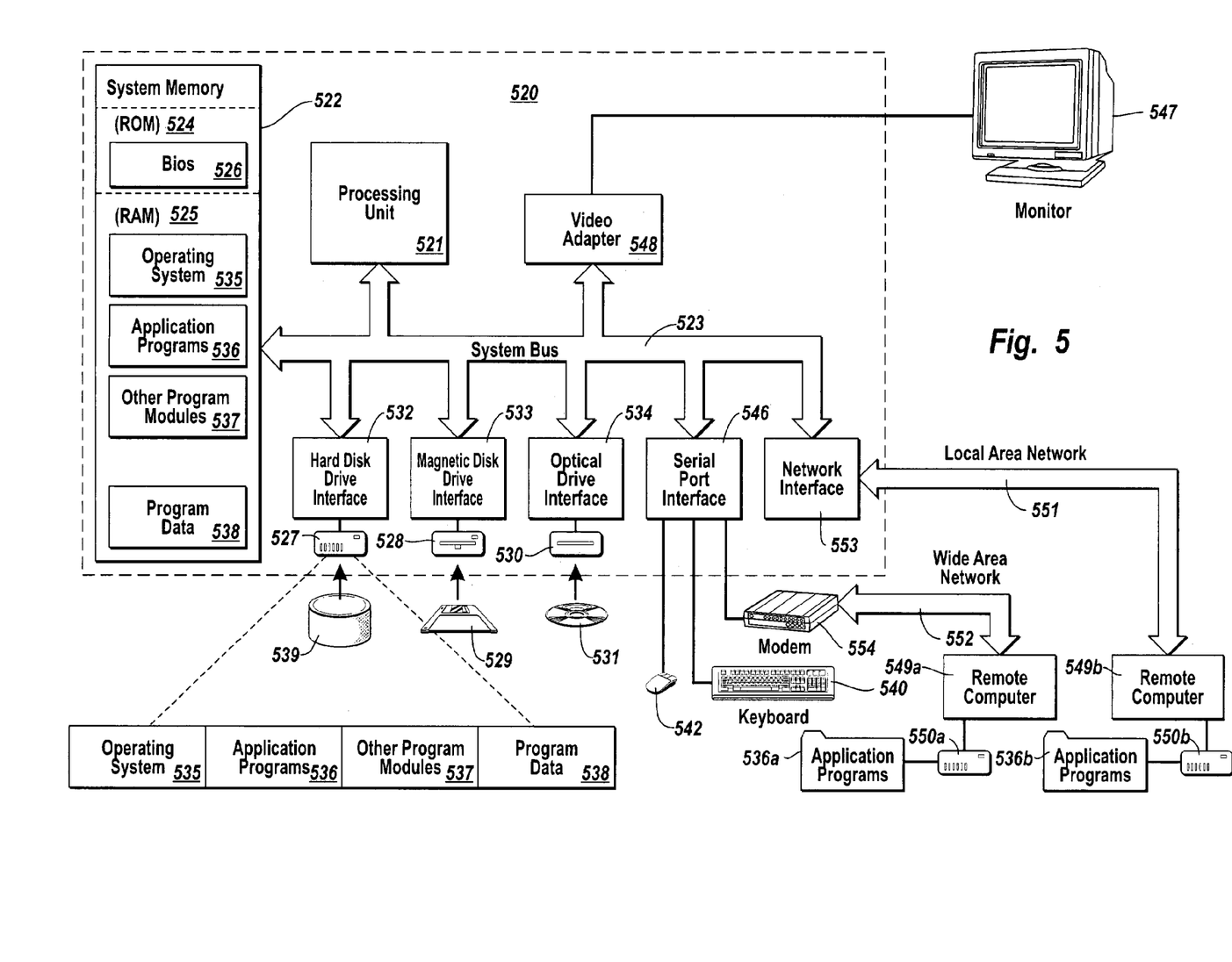
FIG. 5 illustrates an exemplary system that provides a suitable operating environment for the present invention.

FIG. 5 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 5, an example system for implementing the invention includes a general purpose computing device in the form of a conventional computer 520, including a processing unit 521, a system memory 522, and a system bus 523 that couples various system components including the system memory 522 to the processing unit 521. The system bus 523 may be any of several types of bus structures including a memory bus or memory controller, a peripheral bus, and a local bus using any of a variety of bus architectures. The system memory includes read only memory (ROM) 524 and random access memory (RAM) 525. A basic input/output system (BIOS) 526, containing the basic routines that help transfer information between elements within the computer 520, such as during start-up, may be stored in ROM 524.

The computer 520 may also include a magnetic hard disk drive 527 for reading from and writing to a magnetic hard disk 539, a magnetic disk drive 528 for reading from or writing to a removable magnetic disk 529, and an optical disc drive 530 for reading from or writing to removable optical disc 531 such as a CD-ROM or other optical media. The magnetic hard disk drive 527, magnetic disk drive 528, and optical disc drive 530 are connected to the system bus 523 by a hard disk drive interface 532, a magnetic disk drive-interface 533, and an optical drive interface 534, respectively. The drives and their associated computer-readable media provide nonvolatile storage of computer-executable instructions, data structures, program modules and other data for the computer 520. Although the exemplary environment described herein employs a magnetic hard disk 539, a removable magnetic disk 529 and a removable optical disc 531, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 539, magnetic disk 529, optical disc 531, ROM 524 or RAM 525, including an operating system 535, one or more application programs 536, other program modules 537, and program data 538. A user may enter commands and information into the computer 520 through keyboard 540, pointing device 542, or other input devices (not shown), such as a microphone, joy stick, game pad, satellite dish, scanner, or the like. These and other input devices are often connected to the processing unit 521 through a serial port interface 546 coupled to system bus 523. Alternatively, the input devices may be connected by other interfaces, such as a parallel port, a game port or a universal serial bus (USB). A monitor 47 or another display device is also connected to system bus 523 via an interface, such as video adapter 548. In addition to the monitor, personal computers typically include other peripheral output devices (not shown), such as speakers and printers.

The computer 520 may operate in a networked environment using logical connections to one or more remote computers, such as remote computers 549*a* and 549*b*. Remote computers 549*a* and 549*b* may each be another personal computer, a server, a router, a network PC, a peer device or other common network node, and typically include many or all of the elements described above relative to the computer 520, although only memory storage devices 550*a* and 550*b* and their associated application programs 536*a* and 536*b* have been illustrated in FIG. 5. The logical connections depicted in FIG. 5 include a local area network (LAN) 551 and a wide area network (WAN) 552 that are presented here by way of example and not limitation. Such networking environments are commonplace in office-wide or enterprise-wide computer networks, intranets and the Internet.

When used in a LAN networking environment, the computer 520 is connected to the local network 551 through a network interface or adapter 553. When used in a WAN networking environment, the computer 520 may include a modem 554, a wireless link, or other means for establishing communications over the wide area network 552, such as the Internet. The modem 554, which may be internal or external, is connected to the system bus 523 via the serial port interface 546. In a networked environment, program modules depicted relative to the computer 520, or portions thereof, may be stored in the remote memory storage device. It will be appreciated that the network connections shown are exemplary and other means of establishing communications over wide area network 552 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product implementing a messaging infrastructure which abstracts various processing layers within the infrastructure, wherein the infrastructure provides a base level of messaging functionality, and wherein the abstract processing layers are extensible such that changes or enhancements can be made without necessarily having to re-implement the base level of messaging functionality provided in other abstract processing layers, the computer program product comprising one or more computer readable media carrying computer executable instruction in the form of program modules, the program modules being interchangeable at each processing layer such that any program module corresponding to one processing layer can be used without necessitating the use of certain programming modules corresponding to different processing layers, the program modules comprising:

one or more messaging layer modules providing for endpoint-to-endpoint transmission of one or more messages and implementing support for one or more message transport protocols, the one or more message layer modules selectable for use in communicating without necessitating the use of particular channel layer modules and particular service layer modules;

one or more channel layer modules providing message exchange semantics on top of the one or more message layer modules, the one or more channel layer modules selectable for use in communicating without necessitating the use of particular messaging layer modules and particular service layer modules; and one or more service layer modules providing one or more programming models on top of the one or more channel layer modules for interacting with the messaging infrastructure by exposing one or more features of the messaging infrastructure to be accessed by software designed to use the messaging infrastructure, the one or more service layer modules selectable for use in communicating without necessitating the use of particular messaging layer modules and particular channel layer modules.

2. The computer program product as recited in claim 1, wherein the one or more message transport protocols comprise as least one of named pipes, transmission control protocol (TCP), hypertext transfer protocol (HTTP), and simple mail transfer protocol (SMTP).

3. The computer program product as recited in claim 1, wherein the one or more messaging layer modules allow for message interception as a message leaves from or arrives at an endpoint.

4. The computer program product as recited in claim 3, wherein the one or more messaging layer modules implement behavior that comprises at least one of routing, filtering, policy management, logging, transactions, and security.

5. The computer program product as recited in claim 1, wherein the one or more channel layer modules implement at least one of (i) a datagram channel for unidirectional uncorrelated messaging, (ii) a dialog channel for bidirectional correlated messaging, (iii) a monolog channel for unidirectional broadcast messaging, including publication/subscription messaging, and (iv) a queue channel for unidirectional queued messaging.

6. The computer program product as recited in claim 1, wherein the one or more service layer modules providing one or more programming models on top of the one or more channel layer modules implement a direct mapping between one or more web services description language (WSDL) port types and one or more managed types within the messaging infrastructure.

7. The computer program product as recited in claim 1, wherein the one or more messaging layer modules comprise a port providing an atomistic message send/receive abstraction to the one or more channel layer modules.

8. The computer program product as recited in claim 1, wherein the one or more channel layer modules comprise a channel manager that gathers and correlates messages and presents a higher-level channel abstraction to the one or more service layer modules.

9. The computer program product as recited in claim 1, wherein the one or more service layer modules comprise a service manager that coordinates the messaging infrastructure by associating one or more service binders with one or more other managers within the messaging infrastructure.

10. The computer program product as recited in claim 9, wherein the service manager supports extensibility by delegating one or more tasks to other modules within the infrastructure appropriate for the one or more tasks.

11. The computer program product as recited in claim 9, wherein the one or more channel layer modules comprise one or more channel instances, and wherein the one or more service layer modules comprise one or more service binders, one or more service instances, and one or more service proxies that bind the one or more channel instances to the one or more service instances.

12. The computer program product as recited in claim 11, wherein the one or more service instances represent one or more instances of user code for interacting with the messaging infrastructure, the one or more channel instances represent one or more instances of one or more channels for handling one or more messages of a particular type either destined for or originating from the one or more service instances, and the one or more service binders manage how the one or more service instances and the one or more channel instances relate to and communicate with each other through the one or more service proxies.

13. The computer program product as recited in claim 12, wherein the one or more service layer modules comprise (i) a service store that manages physical lifetime for the one or more service instances, and (ii) one or more service extensions that intercept one or more messages flowing in to and out of the one or more service instances, wherein the one or more service extensions implement behavior comprising at least one of routing, filtering, policy management, and security.

14. In a messaging infrastructure comprising a plurality of processing layers providing certain initial functionality for processing one or more messages, a method of abstracting the plurality of processing layers within the messaging infrastructure so that subsequent changes or enhancements to the messaging infrastructure can be made while retaining the certain initial functionality, the messaging infrastructure being capable of supporting any number of combinations of message transport implementations, message exchange implementations and binding implementations within each respective processing layer, the method comprising acts of:
   defining a message layer interface that abstracts one or more message transport implementations for one or more higher layers within the messaging infrastructure without necessitating the use of a particular channel layer interface and particular service layer interface;
   defining a channel layer interface on top of the message layer interface, wherein the channel layer interface abstracts one or more message exchange implementations for one or more higher layers within the messaging infrastructure without necessitating the use of a particular message layer interface and particular service layer interface; and
   defining a service layer interface on top of the channel layer interface, wherein the service layer interface abstracts one or more binding implementations that bind the one or more message exchange implementations, through the channel layer interface, to user code for one or more message processing implementations built on top of the messaging infrastructure without necessitating the use of a particular message layer interface and particular channel layer interface.

15. The method as recited in claim 14, wherein the service layer interface, at least in part, describes a programming model for using the messaging infrastructure.

16. The method as recited in claim 15, wherein the programming model specifies a mapping between one or more web services description language (WSDL) port types and one or more managed types within the messaging infrastructure.

17. The method as recited in claim 14, wherein the message layer interface, channel layer interface, and service layer interface each correspond to a plurality of program modules for the one or more message transport implementations, the one or more message exchange implementations, and the one or more binding implementations.

18. The method as recited in claim 14, wherein the one or more message transport protocols comprise as least one of named pipes, transmission control protocol (TCP), hypertext transfer protocol (HTTP), and simple mail transfer protocol (SMTP).

19. The method as recited in claim 14, wherein the one or more message exchange implementations comprise at least one of (i) a datagram channel for unidirectional uncorrelated messaging, (ii) a dialog channel for bidirectional correlated messaging, (iii) a monolog channel for unidirectional broadcast messaging, including publication/subscription messaging, and (iv) a queue channel for unidirectional queued messaging.

20. The method as recited in claim 14, wherein the message layer interface further abstracts one or more ports, each providing an atomistic message send/receive abstraction.

21. The method as recited in claim 14, wherein the one or more binding implementations comprise one or more service binder implementations that perform the binding of the one or more message exchange implementations to the one or more message processing implementations built on top of the messaging infrastructure.

22. The method as recited in claim 21, wherein the one or more service binder implementations use one or more service proxy implementations to perform the binding of the one or more message exchange implementations to the one or more message processing implementations built on top of the messaging infrastructure.

23. The method as recited in claim 22, wherein the messaging infrastructure comprises one or more instances of the one or more message exchange implementations and one or more instances of the one or more message processing implementations, and wherein a separate service proxy instance binds each of the one or more message exchange instances to a corresponding message processing instance.

24. The method as recited in claim 23, wherein the service layer interface abstracts a service store implementation that manages physical lifetime for the one or more message processing instances.

25. A computer program product for use in a messaging infrastructure comprising a plurality of processing layers providing certain initial functionality for processing one or more messages, the computer program product comprising one or more computer readable media carrying computer executable instructions that implement a method of abstracting the plurality of processing layers within the messaging infrastructure so that subsequent changes or enhancements to the messaging infrastructure can be made while retaining the certain initial functionality, the messaging infrastructure being capable of supporting any number of combinations of message transport implementations, message exchange implementations and binding implementations within each respective processing layer, the computer executable instructions, when executed, causing the messaging infrastructure to perform the following:
   defining a message layer interface that abstracts one or more message transport implementations for one or more other layers within the messaging infrastructure without necessitating the use of a particular channel layer interface and particular service layer interface;
   defining a channel layer interface on top of the message layer interface, wherein the channel layer interface abstracts one or more message exchange implementations for one or more other layers within the messaging infrastructure without necessitating the use of a particular message layer interface and particular service layer interface; and defining a service layer interface on top of the channel layer interface, wherein the service layer interface abstracts one or more binding implementations that bind the one or more message exchange implementations, through the channel layer interface, to user code for one or more message processing implementations built on top of the messaging infrastructure without necessitating the use of a particular message layer interface and particular channel layer interface.

26. The computer program product as recited in claim 25, wherein the service layer interface, at least in part, describes a programming model for using the messaging infrastructure.

27. The computer program product as recited in claim 25, wherein the message layer interface, channel layer interface, and service layer interface each correspond to a plurality of program modules for the one or more message transport implementations, the one or more message exchange implementations, and the one or more binding implementations.

28. The computer program product as recited in claim 25, wherein the one or more message transport protocols comprise as least one of named pipes, transmission control protocol (TCP), hypertext transfer protocol (HTTP), and simple mail transfer protocol (SMTP).

29. The computer program product as recited in claim 25, wherein the one or more message exchange implementations comprise at least one of (i) a datagram channel for unidirectional uncorrelated messaging, (ii) a dialog channel for bidirectional correlated messaging, (iii) a monolog channel for unidirectional broadcast messaging, including publication/subscription messaging, and (iv) a queue channel for unidirectional queued messaging.

30. The computer program product as recited in claim 25, wherein the message layer interface further abstracts one or more ports, each providing an atomistic message send/receive abstraction.

31. The computer program product as recited in claim 25, wherein the one or more binding implementations comprise one or more service binder implementations that perform the binding of the one or more message exchange implementations to the one or more message processing implementations built on top of the messaging infrastructure.

32. The computer program product as recited in claim 25, wherein the one or more service binder implementations use one or more service proxy implementations to perform the binding of the one or more message exchange implementations to the one or more message processing implementations built on top of the messaging infrastructure.

33. The computer program product as recited in claim 32, wherein the messaging infrastructure comprises one or more instances of the one or more message exchange implementations and one or more instances of the one or more message processing implementations, and wherein a separate service proxy instance binds each of the one or more message exchange instances to a corresponding message processing instance, and wherein the service layer interface abstracts a service store implementation that manages physical lifetime for the one or more message processing instances.

34. In a messaging infrastructure comprising a plurality of processing layers providing certain initial functionality for processing one or more messages, a method for abstracting the plurality of processing layers within the messaging infrastructure so that subsequent changes or enhancements to the messaging infrastructure can be made while retaining the certain initial functionality, the messaging infrastructure being capable of supporting any number of combinations of message transport implementations, message exchange implementations and binding implementations within each respective processing layer, the method comprising steps for:

within a message layer, abstracting one or more message transport implementations for use in one or more other layers within the messaging infrastructure without necessitating the use of a particular channel layer interface and particular service layer interface;

within a channel layer above the message layer, abstracting one or more message exchange implementations for use in one or more other layers within the messaging infrastructure without necessitating the use of a particular message layer interface and particular service layer interface; and within a service layer above the channel layer, abstracting one or more binding implementations for binding the one or more message exchange implementations to user code corresponding to one or more message processing implementations that use the messaging infrastructure without necessitating the use of a particular message layer interface and particular channel layer interface.

35. The method as recited in claim 34, wherein the service layer, at least in part, describes a programming model for using the messaging infrastructure.

36. The method as recited in claim 34, wherein the message layer abstraction, the channel layer abstraction, and the service layer abstraction correspond to a plurality of program modules for the one or more message transport implementations, the one or more message exchange implementations, and the one or more binding implementations.

37. The method as recited in claim 34, wherein the message layer abstraction further abstracts one or more ports, each providing an atomistic message send/receive abstraction.

38. The method as recited in claim 37, wherein the messaging infrastructure comprises one or more instances of the one or more message exchange implementations and one or more instances of the one or more message processing implementations, and wherein the one or more binding implementations comprise one or more service binder implementations that use one or more service proxy instances to bind each message exchange instance to a corresponding message processing instance.

39. The method as recited in claim 38, wherein the service layer abstraction further abstracts a service store implementation that manages physical lifetime for the one or more message processing instances.

40. The method as recited in claim 39, wherein the one or more message transport protocols comprise as least one of named pipes, transmission control protocol (TCP), hypertext transfer protocol (HTTP), and simple mail transfer protocol (SMTP).

41. The method as recited in claim 40, wherein the one or more message exchange implementations comprise at least one of (i) a datagram channel for unidirectional uncorrelated messaging, (ii) a dialog channel for bidirectional correlated messaging, (iii) a monolog channel for unidirectional broadcast messaging, including publication/subscription messaging, and (iv) a queue channel for unidirectional queued messaging.

* * * * *